United States Patent [19]

Okai et al.

[11] Patent Number: 4,885,032

[45] Date of Patent: Dec. 5, 1989

[54] ALUMINUM FLAKE PIGMENT

[75] Inventors: Toshihiro Okai, Katano; Yoshiaki Okumura, Joyo; Mitsuyuki Oda, Kyoto; Takashi Yamamoto, Souraku; Teruaki Kuwajima, Higashiosaka, all of Japan

[73] Assignee: Nippon Paint Co., Ltd., Osaka, Japan

[21] Appl. No.: 90,969

[22] Filed: Aug. 31, 1987

[51] Int. Cl.$^4$ .............................................. B22F 1/00
[52] U.S. Cl. ...................................... 75/251; 106/404
[58] Field of Search ....................... 75/251, 252, 0.5 A, 75/0.5 AA; 427/216; 148/105; 106/404

[56] References Cited

U.S. PATENT DOCUMENTS

| | | | |
|---|---|---|---|
| 3,669,764 | 6/1972 | Bradshaw et al. | 427/416 |
| 3,669,765 | 6/1972 | Bradshaw et al. | 427/416 |
| 3,890,166 | 6/1975 | Kondis | 427/416 |
| 4,360,377 | 11/1982 | Steck et al. | 75/251 |

FOREIGN PATENT DOCUMENTS

| | | |
|---|---|---|
| 0015020 | 3/1980 | European Pat. Off. . |
| 0104075 | 3/1984 | European Pat. Off. . |
| 0129491 | 12/1984 | European Pat. Off. . |
| 1294139 | 4/1969 | Fed. Rep. of Germany . |
| 1012801 | 1/1986 | Japan .................... 427/416 |
| 1140052 | 1/1969 | United Kingdom . |

OTHER PUBLICATIONS

Chemical Abstracts, vol. 96, No. 10, Mar. 1982 Showa Aluminium K.K.

Primary Examiner—L. Dewayne Rutledge
Assistant Examiner—David Schumaker
Attorney, Agent, or Firm—Wenderoth, Lind & Ponack

[57] ABSTRACT

Disclosed is a metal particle having a maximum dimension of not more than 1 mm surface-treated with an aqueous solution containing phosphate ions, soluble ions of vanadium and oxygen. This particle can be a metallic pigment having excellent brightness retention and wetting properties to a binder resin.

3 Claims, No Drawings

ALUMINUM FLAKE PIGMENT

FIELD OF THE INVENTION

The present invention relates to metal particles, especially a metal pigment.

BACKGROUND OF THE INVENTION

Generally, metal particles, such as zinc particles, iron particles, stainless steel particles, copper-zinc-nickel alloy particles, resin or glass particles plated with metal, corrode in the presence of water, oxygen or electrolyte ions. It is required that the metal particles are, therefore, carefully handled. For example, they are stored in a nitrogen blanket or an organic solvent in order to separate from corrosive conditions. If the metal particles corroded in a high corrosion rate, hydrogen gas which is difficult to deal with would be produced. Also, if they are formulated into a coating composition, they corrode by an invasion of water, oxygen or an electrolyte into a coating to result in a decline of the coatings.

In order to prevent the corrosion, it is proposed to allow the metal particles to contact with a chromate ion. The chromate ion has two functions. One is an oxidizer function whereby the chromate ion ($CrO_4^{2-}$) is reacted with a metal atom, such as Fe to form stable gamma-$Fe_2O_3$, and the other is a deposition function whereby the chromate ion is reduced to form a chromium oxide, for example $Cr_2O_3$ which is deposited on a metal surface. According to these two functions, a physical barrier film is formed on the metal surface to develop excellent corrosion preventive properties.

however, the chromium (VI) having high corrosion preventive properties is toxic to human body and therefore very limited in use by several regulations in Japan. Accordingly, many efforts have been paid to develop a corrosion preventive agent which is not toxic or has little toxicity to the human body. For example, phosphate materials, especially zinc phosphate, silica phosphate, aluminum condensed phosphate and the like are now being studied and some of them are commercially available. The phosphate materials, however, have only a deposition function whereby the phosphate materials are reacted with metal to produce a material protecting the metal substrate, and do not have an oxidizer function. The phosphate materials have low corrosion preventive properties in comparison with the above mentioned chromate ions.

The present inventors have proposed that the oxidizer function which was lacking in the phosphate materials could be compensated for by a soluble ion of vanadium (see Japanese Patent Application Ser. No. 204794/1986). The inventors further developed a novel surface treatment process for the metal particles.

SUMMARY OF THE INVENTION

The present invention is to provide a metal particle having a maximum dimension of not more than 1 mm surface-treated with an aqueous solution containing phosphate ions, soluble vanadium ions and oxygen.

DETAILED DESCRIPTION OF THE INVENTION

The soluble vanadium ions supplement the oxidizer function which lacking in the phosphate ions. The vanadium ions form redox couples under corrosive conditions containing water and oxygen, whereby a redox douple indicates a noble redox potential and then fulfils the oxidizer function. On the other hand, as mentioned previously, phosphate ions form, under the corrosive conditions, a deposited film (probably $FePO_4$), thus providing a deposition function. Accordingly, these two species of ions are indispensable in embodying the present invention, and the effect of the invention is not attained when even one of these two species is absent.

The soluble ions of vanadium used in the present invention are monomeric ions or polymeric ions having a tetravalent and pentavalent vanadium element, including $V^{3+}$, $VOH^{2+}$, $VO^+$, $HVO_2^+$, $HV_2O_5^-$, $HVO_3^+$, $Vo_2^+$, $H_3V_2O_7^-$, $H_2VO_4^-$, $HVO_4^{2-}$, $VO_4^{3-}$, $HV_2O_7^{3-}$, $V_2O_7^{4-}$, $V_3O_3^{3-}$, $V_4O_{12}^{4-}$, $H_2V_{10}O_{28}^{4-}$, $H_2V_{10}O_{28}^{5-}$, $V_{10}O_{28}^{6-}$ and the like. In essence, these ions of vanadium are categorized into vanadium ions, vanadyl ions, orthovanadate ions and condensed vanadate ions. Vanadate ions and condensed vanadate ions are preferable. These two ion species usually exist in an aqueous solution as a mixture, as known to in art. When a pH is around neutral (within the range of 5 to 9), the condensed vanadate ions prevail in the solution and a trace amount of orthovanadate ions are present, because the orthovanadate ions are condensed with each other in an aqueous solution. Typical examples of the condensed vanadate ions are pyrovanadate ions, metavanadate ions, trivanadate ions, tetravanadate ions, hexavanadate ions, decavanadate ions and the like.

Examples of the phosphate ions are orthophosphate ions, pyrophosphate ions, tripolyphosphate ions, higher condensed phosphate ions, trimetaphosphate ions, tetrametaphosphate ions or higher condensed metaphosphate ions. The phosphate ions are present in an aqueous solution in various forms due to condensation degree and pH. Generally, the phosphate ions are condensates in an aqueous solution.

To supply such soluble ions of vanadium and phosphate ions, an ion carrier such as an ion-exchange resin or inorganic ion exchange material (for example, hydrotalcite) may be allowed to absorb these ions. A corrosion preventive agent, which is prepared by mixing a phosphate ion source and a source of soluble ion of vanadium, or by baking or melting the phosphate ion source and source of soluble ion of vanadium, may be added in an aqueous solution to get off the phosphate ions and the soluble ions of vanadium. Such a corrosion preventive agent, especially a corrosion preventive pigment, are disclosed in Japanese Patent Application Ser. Nos. 36191/1987, 36192/1987, 36189/1987 and 16190/1987.

It is necessary that there is oxygen in the aqueous solution. It is not always necessary to provide oxygen in the aqueous solution. It is sufficient to use natural or deionized water, because such water contains dissolved oxygen. If the treatment is carried out in a condition having no oxygen, it is necessary to introduce oxygen in the aqueous solution.

A method, wherein the metal particles are surface-treated with the aqueous solution containing the soluble ions of vanadium, phosphate ions and oxygen, may comprise spraying the aqueous solution onto the metal particles floated in air. Preferably, the metal particles may be immersed in the aqueous solution for treatment, especially under mixing or ultrasonic vibration by which agglomeration of the particles is effectively prevented for a uniform treatment.

Any shape of the metal particles can be used in the present invention. Examples of the shape are spherical, flaky, hollow or amorphous. A maximum dimension of the particles can be not more than 1 mm, preferably within the range of 1 to 100 micron. The particles can be made from zinc, zinc/iron alloy, aluminum, an aluminum alloy, steel, stainless steel, copper, copper/zinc/nickel alloy, copper, resin or glass particles plated with metal on the surface. Preferably, the particles are metal pigments. More preferred is a flake aluminum pigment. The aluminum pigment generally reacts with water or many electrolytes in a paint to significantly reduce brightness and to become black, so that it can not usable for a pigment. The aluminum pigment treated as disclosed in the present invention has excellent brightness retention and enhances the wetting properties to a binder component in the coating composition.

The treating conditions are not limited if the aqueous solution for treatment contains the soluble ions of vanadium, phosphate ions and oxygen. The treating condition preferably are carried out at a pH of 5 to 9. The amount of the soluble ions of vanadium and phosphate ions are respectively 0.001 to 0.1 mole/liter, preferably 0.05 to 0.1 mole/liter. Amounts outside of the above range deteriorate the technical effect of the present invention. A temperature for treatment is not specifically limited. A high temperature reduces the treatment period.

The aqueous solution for treatment may further contain other additives, such as a surfactant; and cations, such as calcium ions and magnesium ions.

The surface treated metal particles has a very thin film, a so-call passive film, on the surface, but maintains its features as particles. The particle can be easily handled and can be stored in the air. The treatment of the present invention prevents a color change of the metal particles for a long time. The treatment of the present invention enhances the wetting properties to a resin binder and reduces the period of time for a dispersing process.

EXAMPLES

The present invention is illustrated by the following examples which, however, are not to be construed as limiting the invention to their details.

Examples 1 to 4 and Comparative Examples 1 to 3

The present example shows the technical effect of the treatment of the present invention.

0.05 mole of orthophosphoric acid was added to a 0.05 mole aqueous solution of sodium orthovanadate and a pH was adapted to 7 by sodium hydroxide to form an aqueous solution A for treatment. Another aqueous solution B only containing 0.05 mole of orthophosphoric acid was prepared in a similar manner. The metal particles shown in Table 1 were immersed in the aqueous solutions A and B and deionized water for one hour and then rinsed with deionized water to dry. The obtained particles were allowed to stand in the air at 40° C. for 7 days and its color was visually evaluated. The result is shown in Table 1.

TABLE 1

| Example number | Metal particles | Color change degree |
|---|---|---|
| 1 | Copper particles having an average particle size of 2 micrometer | Same before treatment |
| 2 | Zinc particles having an average particle size of 5 micrometer | Same before treatment |
| 3 | Aluminum flake having a length of 50 micrometer and a thickness of | Same before treatment |

TABLE 1-continued

| Example number | Metal particles | Color change degree |
|---|---|---|
| 4 | 0.5 micrometer Copper plated polystyrene/acrylonitrile resin particles having a particle size of 100 micrometer | Same before treatment |
| Comparative Example | | |
| 1 | Zinc particles having an average particle size of 5 micrometer treated with the solution B | Cloudy white to light gray |
| 2 | Zinc particles having an average particle size of 5 micrometer treated with deionized water | light gray |
| 3 | Copper particles having an average particle size of 3 micrometer treated with deionized water | Black |

Examples 5 to 7

Copper particles having an average particle size of 2 micrometer was surface-treated with an aqueous solution containing sodium phosphate and vanadium pentoxide by changing a pH of the solution. Treatment and evaluation were carried out as generally described in Examples 1 to 4. The result is shown in Table 2.

TABLE 2

| Example number | pH of aqueous solution for treatment | Color change degree |
|---|---|---|
| 5 | 5 | Slightly brightness reduced |
| 6 | 7 | Same before treatment |
| 7 | 9 | Slightly brightness reduced |

Examples 8 to 12

A test was carried out as generally described in Examples 1 to 4 with the exception that copper particles having an average particle size of 2 micrometer were employed and concentrations of the phosphate ions and vanadate ions were changed. The result is shown in Table 3.

TABLE 3

| Example number | Concentration of phosphate ions ($PO_4^{3-}$) | Concentration of vanadate ions ($VO_4^{3-}$) | Color change degree |
|---|---|---|---|
| 8 | 0.1 mole | 0.1 mole | Same before treatment |
| 9 | 0.05 mole | 0.05 mole | Same before treatment |
| 10 | 0.001 mole | 0.001 mole | Slightly brightness reduced |
| 11 | 0.1 mole | 0.001 mole | Slightly brightness reduced |
| 12 | 0.001 mole | 0.1 mole | Slightly brightness reduced |

Examples 13 to 19

The present invention shows the technical effects of an aluminum flake pigment surface treated according to the present invention.

An aluminum flake pigment was surface treated as generally described in Examples 1 to 4, with the exception that the pH of the aqueous solution and concentrations of the phosphate ions and vanadate ions were changed as shown in Table 5. The obtained aluminum flake pigment was formulated into an aqueous coating composition, of which preparation was described after Table 5. An amount of hydrogen gas generated from the coating composition was measured by collecting in a flask. Also, the aqueous coating composition was poured in a test tube and allowed to stand for 10 day at 50° C. The precipitated aluminum flake was visually evaluated. Further, the aqueous coating composition was spray coated as described in a coating test after Table 4 and its brightness of the cured coatings was visually evaluated.

Evaluation was made as follow: An aluminum flake pigment coated with a conventional organic phospate was made standard. By comparing with the standard, good, excellent, bad and very bad were determined.

The result of the test is shown in Table 4

TABLE 4

| Example number | Concentration of phosphate ions ($PO_4^{3-}$) | Concentration of vanadate ions ($VO_4^{3-}$) | pH | Amount of hydrogen gas | Precipitation | Brightness |
| --- | --- | --- | --- | --- | --- | --- |
| 13 | 0.001 mole | 0.1 mole | 7 | Good | Good | Good |
| 14 | 0.1 mole | 0.001 mole | 7 | Good | Good | Good |
| 15 | 0.1 mole | 0.1 mole | 7 | Excellent | Good | Good |
| 16 | 0.001 mole | 0.001 mole | 7 | Good | Good | Good |
| 17 | 0.05 mole | 0.05 mole | 5 | Good | Good | Excellent |
| 18 | 0.05 mole | 0.05 mole | 7 | Excellent | Good | Excellent |
| 19 | 0.05 mole | 0.05 mole | 9 | Good | Good | Excellent |
| Comparative Example 4 | 0.05 mole | — | 7 | Good | Good | Bad |
| 5 | — | 0.05 mole | 7 | Standard | Standard | Good |
| 6 | Conventional phosphate | | | Standard | Standard | Standard |

PREPARATION OF COATING COMPOSITION (Preparation of polyester resin)

A two liter flask equipped with a stirrer, a nitrogen-introducing tube, a temperature controlling apparatus, a condenser and a decanter was charged with 130 parts by weight of bishydroxyethyl taurine, 134 parts by weight of neopentyl glycol, 236 parts by weight of azelaic acid, 186 parts by weight of phthalic anhydride, and 27 parts by weight of xylene, and heated to start a reaction. Water produced by the reaction was azeotropically distilled together with xylene.

The mixture was heated to 190° C. over about 2 hours after commencing reflux and continued to mix and distill until an acid value corresponding to carboxylic acid was 145. The mixture was then cooled to 140° C. and 314 parts by weight of Cardura E 10 (glycidyl ester of versatic acid available from Shell Chemical Company) was added for 30 minutes while maintaining 140° C. Mixing was continued for 2 hours to terminate the reaction. The obtained polyester resin had an acid value of 59, a hydroxyl value of 90 and Mn 1054.

(Preparation of resin particles)

A one liter reaction vessel equipped with a stirrer, a condenser and a temperature controlling apparatus was charged with 282 parts by weight of deionized water, 10 parts by weight of the polyester resin obtained above and 0.75 parts by weight of dimethylethanolamine to form a mixture. a solution containing 4.5 parts by weight of azobiscyanovaleric acid, 45 parts by weight of deionized water and 4.3 parts by weight of dimethylethanolamine was added to the mixture, to which a solution containing 70.7 parts by weight of methyl methacrylate, 94.2 parts by weight of n-butyl acrylate, 70.7 parts by weight of styrene, 30 parts by weight of 2-hydroxyethyl acrylate and 4.5 parts by weight of ethylene glycol dimethyl acrylate was added dropwise for 60 minute. After addition, a solution containing 1.5 parts by weight of azobiscyanovaleric acid, 15 parts by weight of deionized water and 1.4 parts by weight of dimethylethanolamine was added and mixed at 80° C. for 60 minutes to obtain an emulsion having non-volatile 45%, pH 7.2, viscosity 92 cps (25° C.) and a particle size of 0.165 micron. The emulsion was spray-dried to obtain resin particles having a particle size of 0.3 micron. 100 parts by weight of the particles were dispersed in 200 parts by weight of xylene to obtain a xylene dispersion.

(Preparation of a resin for metallic coating composition)

A reaction vessel equipped with a stirrer, a temperature controlling apparatus and a condenser was charged with 76 parts by weight of ethylene glycol monobutyl ether and 61 parts by weight of a monomer solution (containing 45 parts by weight of styrene, 63 parts by weight of methyl methacrylate, 48 parts by weight 2-hydroxyethyl methacrylate, 117 parts by weight of n-butyl acrylate, 27 parts by weight of methacrylic acid, 3 parts by weight of laurylmercaptane and 3 parts by weight of azobisisobutylonitrile) at 120° C. and mixed for one hour. 28 parts by weight of dimethylethanolamine and 200 parts by weight of deionized water was added to the resultant mixture to obtain an acrylic varnish having non-volatile 50% and Mn 6,000. The resin had a OH value of 70, and an acid value of 58.

(Preparation of metallic coating composition)

A mixture of 140 parts by weight of the resin varnish mentioned above, 30 parts by weight of the resin dispersion, 10 parts by weight of aluminum pigment and 30 parts by weight of Cymel 303 as a cross-linking agent was diluted with deionized water up to 25 to 30 seconds of No. 4 Ford Cup (20° C.) to form a metallic coating composition.

(Preparation of clear coating composition)

A polymer was prepared as generally described in the above (Preparation of a resin for metallic coating composition), using 65.8 parts by weight of n-butyl acrylate, 11.8 parts by weight of methyl methacrylate, 16.2 parts by weight of hydroxyethyl methacrylate, 6.1 parts by weight of methacrylic acid and 5 parts by weight of azobisisobutylonitrile. The polymer was neutralized with dimethylethanolamine and then diluted with water to obtain a resin varnish having non-volatile 50%.

To the obtained resin varnish, a cross-linking agent (hexamethoxymethylolmelamine available from Mitsui Toatsu Company as "Cymel 303" was added in a solid/resin ratio of 70/30 and diluted up to 30 to 35 seconds (20° C.) of No. 4 Ford Cup to obtain an aqueous clear coating composition.

(Coating test)

The metallic coating composition was spray-applied to an intermediate coated steel panel in a thickness of 20 micron at 23° C. and 60% relative humidity, on which the clear coating composition was spray-applied in a thickness of 30 micron in a same condition mentioned above. The former was coated in two stages at an interval of one minute and then it was dried at 80° C. for 5 minutes. The latter was then coated in one stage and allowed to a setting of 7 minutes. The coated panel was cured at 150° C. for 20 minutes to obtain a sample panel.

What is claimed is:

1. An aluminum flake pigment for metallic paint of a maximum dimension of not more than 1 mm having excellent brightness retention and resistance to corrosion, which is coated with a film resulting from an aqueous solution containing phosphate ions, soluble ions of vanadium and oxygen such as to render the aluminum flakes resistant to corrosion, said aqueous solution containing 0.001 to 0.1 mole/liter of the phosphate ions, 0.001 to 0.1 mole/liter of the soluble ions of vanadium and having a pH of 5 to 9.

2. The aluminum flake pigment according to claim 1 wherein said aluminum flake pigment was prepared by spraying said aqueous solution onto aluminum flakes, or immersing the aluminum flakes in said aqueous solution, with the proviso that said aluminum flakes have not been treated with an alkaline solution.

3. The aluminum flake pigment according to claim 1 which has been treated with said aqueous solution at a temperature and time sufficient to produce a corrosion resistant film on the surface of aluminum flakes.

* * * * *